US012468243B2

(12) United States Patent
Nishida et al.

(10) Patent No.: US 12,468,243 B2
(45) Date of Patent: Nov. 11, 2025

(54) IMAGE FORMING APPARATUS

(71) Applicant: CANON KABUSHIKI KAISHA, Tokyo (JP)

(72) Inventors: Satoshi Nishida, Kanagawa (JP); Takanori Mitani, Kanagawa (JP); Kohei Okayasu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/814,329

(22) Filed: Aug. 23, 2024

(65) Prior Publication Data

US 2025/0110430 A1 Apr. 3, 2025

(30) Foreign Application Priority Data

Oct. 3, 2023 (JP) ................................ 2023-171920

(51) Int. Cl.

| | |
|---|---|
| ***G03G 15/20*** | (2006.01) |
| ***G03G 15/00*** | (2006.01) |
| ***G03G 15/01*** | (2006.01) |
| *G03G 9/093* | (2006.01) |

(52) U.S. Cl.

CPC ..... *G03G 15/2039* (2013.01); *G03G 15/0189* (2013.01); *G03G 15/2064* (2013.01); *G03G 15/505* (2013.01); *G03G 15/5062* (2013.01); *G03G 9/09357* (2013.01)

(58) Field of Classification Search

USPC ........................................................ 399/36

See application file for complete search history.

(56) References Cited

U.S. PATENT DOCUMENTS

| | | | | |
|---|---|---|---|---|
| 2005/0163523 A1 | 7/2005 | Omata et al. | .......... | G03G 15/20 |
| 2006/0051117 A1 | 3/2006 | Nishida | .................. | G03G 15/20 |
| 2008/0273904 A1 | 11/2008 | Nishida et al. | ........ | G03G 15/20 |
| 2011/0217059 A1 | 9/2011 | Kato et al. | ............. | G03G 15/20 |
| 2011/0236084 A1 | 9/2011 | Nishida et al. | ........ | G03G 15/20 |
| 2012/0155938 A1 | 6/2012 | Tanaka et al. | ......... | G03G 15/20 |
| 2012/0308279 A1 | 12/2012 | Tanaka et al. | ......... | G03G 15/20 |
| 2012/0328341 A1 | 12/2012 | Okayasu et al. | ....... | G03G 15/20 |
| 2014/0314437 A1 | 10/2014 | Nishida et al. | ........ | G03G 15/20 |
| 2014/0314458 A1 | 10/2014 | Mitani et al. | .......... | G03G 15/20 |

(Continued)

FOREIGN PATENT DOCUMENTS

| | | |
|---|---|---|
| JP | 3246942 B2 | 1/2002 |
| JP | 2011-203721 | 10/2011 |

(Continued)

*Primary Examiner* — Quana Grainger

(74) *Attorney, Agent, or Firm* — Venable LLP

(57) ABSTRACT

An image forming apparatus includes a plurality of developing member to form toner images, respectively, a transfer member to sequentially transfer the toner images onto a recording material and to overlappingly form toner on the recording material. A fixing member presses and heats the recording material on which the toner images are transferred and fixes the toner images on the recording material. A storage medium stores a usage history of the developing member. A controller controls a fixing temperature of the fixing member. The controller determines the fixing temperature based on a difference between the usage history of one of the developing member stored in the storage medium and the usage history of another of the developing member.

7 Claims, 9 Drawing Sheets

(56) References Cited

U.S. PATENT DOCUMENTS

| | | | | |
|---|---|---|---|---|
| 2016/0327894 | A1 | 11/2016 | Tsunashima et al. | G03G 15/20 |
| 2016/0342117 | A1 | 11/2016 | Minamishima et al. | G03G 15/20 |
| 2018/0074445 | A1 | 3/2018 | Nishida et al. | G03G 15/20 |
| 2018/0348678 | A1 | 12/2018 | Nakamoto et al. | G03G 15/20 |
| 2019/0317435 | A1* | 10/2019 | Yamashita | G03G 15/2039 |
| 2020/0371459 | A1 | 11/2020 | Takeda et al. | G03G 15/20 |
| 2021/0063924 | A1 | 3/2021 | Ito et al. | G03G 15/20 |
| 2021/0191294 | A1 | 6/2021 | Nishida et al. | G03G 15/20 |
| 2021/0208525 | A1 | 7/2021 | Shinji et al. | G03G 15/20 |
| 2021/0373469 | A1 | 12/2021 | Shinji et al. | G03G 15/20 |
| 2022/0291612 | A1 | 9/2022 | Nishida et al. | G03G 15/20 |
| 2024/0111231 | A1 | 4/2024 | Nishida et al. | G03G 15/20 |

FOREIGN PATENT DOCUMENTS

| | | |
|---|---|---|
| JP | 2012-194447 | 10/2012 |
| JP | 2012-242752 | 12/2012 |
| JP | 2021-060522 | 4/2021 |

* cited by examiner (a)

(b)

IMAGE FORMING APPARATUS

FIELD OF THE INVENTION AND RELATED ART

The present invention relates to an image forming apparatus, for example, to an image forming apparatus provided with a fixing means which fixes a toner image formed in an electrophotographic process onto a transfer material with a thermal fixing means.

Conventionally, in the image forming apparatus using the electrophotographic process, a developing device is provided thereto which supplies developer to an electrostatic latent image formed on a surface of an image bearing member by the surface being scanned and exposed, and develops the electrostatic latent image as a developer image. The developing device is provided with a developer bearing member which bears the developer, a developer container which accommodates the developer, etc., and the developing device is configured to electrostatically supply the developer borne on a surface of the developer bearing member to the surface of the image bearing member. Incidentally, in recent years, it is often the case that the developing device is accommodated together with the image bearing member and other process means (such as a charging member) integrally as a process cartridge.

The developer image developed on the image bearing member is transferred onto a recording material, and then the toner image is fixedly adhered (solidly fixed) on the recording material by passing through a fixing device as an image heating device. For the fixing device, a heat fixing device of contact type is widely used. For example, the fixing device of this type forms a fixing nip portion between a fixing member which is heated to a predetermined fixing temperature by a heating member and a pressing member which is disposed opposite thereto. The fixing device fixes the unfixed toner image formed on the recording material as a solidly fixed image by pressing with applying heat in the fixing nip portion.

As the image forming apparatus and the developing device are used, thermal and mechanical stresses cause to change toner characteristics in the developer container. In addition, changes in developing performance and changes in melting characteristics of the developer occurs, and an appropriate fixing temperature upon fixing in the fixing device changes. Conventionally, it is proposed to change the fixing temperature in accordance with a usage history of the developing device as a means to cope with the changes in the developer (see, for example, U.S. Pat. No. 3,246,942, Patent Application Laid-Open No. 2011-203721, and Patent Application Laid-Open No. 2012-194447).

However, to an image forming apparatus which supports a full color image and overlappingly forms a plurality of toner on a paper, a plurality of the developing devices are provided, and the usage histories of each developing device may vary. And in a case of an image overlappingly formed on the recording material, the appropriate fixing temperature is not simply determined in proportion to the usage history of the developing device. It is known that the appropriate fixing temperature changes depending on relative relationship between the toner characteristics of the toner, which are layered on the recording material, in an upper layer and in a lower layer.

Conventionally, it is not possible to set the fixing temperature corresponding to the changes in characteristics of each toner with taking into account the vertical relationship of the toner overlappingly formed on the recording material.

The present invention is conceived under such a situation, and an object of the present invention is to reduce fixing defect by setting the appropriate fixing temperature corresponding to the changes in each toner, even for the image in which a plurality of the toner are overlappingly formed on the recording material.

SUMMARY OF THE INVENTION

In order to solve the aforementioned problems, the present invention includes the following configuration.

An image forming apparatus comprising: a plurality of developing means configured to form toner images; transfer means configured to sequentially transfer the toner images onto a recording material and to overlappingly form the toner image on the recording material; fixing means configured to press and heat the recording material on which the toner images are transferred and to fix the toner images on the recording material; a storage medium configured to store a usage history of the developing means; and a control means configured to control a fixing temperature of the fixing means, wherein the control means determines the fixing temperature based on a difference between the usage history of one of the developing means stored in the storage medium and the usage history of another of the developing means.

Further features of the present invention will become apparent from the following description of exemplary embodiments with reference to the attached drawings.

DESCRIPTION OF THE EMBODIMENTS

Hereinafter, Embodiments of the present invention will be described using the drawings.

Embodiment 1

(Image Forming Apparatus)

Figure 1:
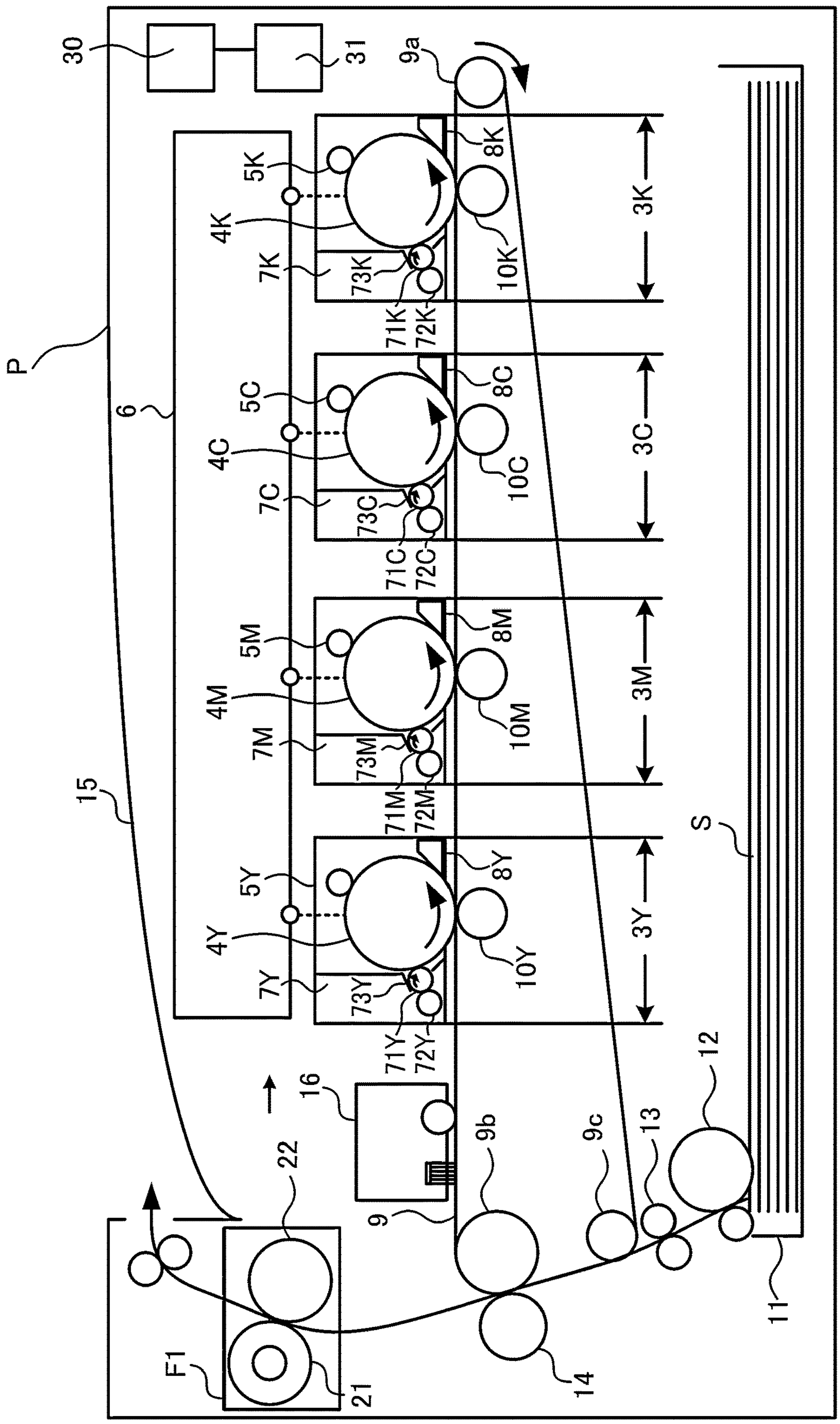
FIG. 1 is a view illustrating an outline configuration of an image forming apparatus in Embodiments 1 through 3.

Hereinafter, an image forming apparatus in an Embodiment 1 will be described. FIG. 1 is a view illustrating an image forming apparatus P in the Embodiment 1, and four image forming stations 3Y, 3M, 3C and 3K, which are disposed along an approximately straight line, are provided thereto. Of the four image forming stations 3Y, 3M, 3C and 3K, the image forming station 3Y is the image forming station which forms an image of yellow (hereinafter abbreviated as Y) color. The image forming station 3M is the image forming station which forms an image of magenta (hereinafter abbreviated as M) color. The image forming station 3C is the image forming station which forms an image of cyan (hereinafter abbreviated as C) color. The image forming station 3K is the image forming station which forms an image of black (hereinafter abbreviated as K) color.

Each image forming station 3Y, 3M, 3C and 3K includes an electrophotographic photosensitive member of drum shape (hereinafter referred to as a "photosensitive drum") 4Y, 4M, 4C and 4K as an image bearing member and a charging roller 5Y, 5M, 5C and 5K as a charging means, respectively. In addition, each image forming station 3Y, 3M, 3C and 3K includes an exposure device 6 as an exposure means, a developing device 7Y, 7M, 7C and 7K as a developing means, and a cleaning device 8Y, 8M, 8C and 8K as a cleaning means, respectively. In the description below, in a case that description is common to each station 3Y, 3M, 3C and 3K, the Y, M, C and K will be omitted from the description such as the photosensitive drum 4, the charging roller 5, the developing device 7.

In the Embodiment 1, the photosensitive drum 4, the charging roller 5 and the developing device 7 are integrated as a process cartridge 2 (see FIG. 3), and are configured to be mountable to and demountable from a main body of the image forming apparatus P (a portion of the image forming apparatus P excluding the process cartridge 2). Provided, as the process cartridge 2 in the present invention, at least the photosensitive drum 4 and the developing device 7 may be provided thereto, and the process cartridge 2 may be configured to be mountable to and demountable from the apparatus main body altogether. In addition, the developing device 7 alone may be configured to be mountable to and demountable from the apparatus main body or the process cartridge 2. In addition, the photosensitive drum 4 and the developing device 7 may be configured to be bundled into the main body of the image forming apparatus to eliminate a need for replacement by a user.

The photosensitive drum 4 is a cylindrical photosensitive member and rotates about an axis thereof in a counterclockwise direction indicated by an arrow in FIG. 1. A surface of the photosensitive drum 4 is uniformly charged by the charging roller 5. In the Embodiment 1, the charging roller 5 is an electroconductive roller in which an electroconductive rubber layer is provided on a core metal, is disposed in parallel with the photosensitive drum 4, is in contact with the photosensitive drum 4 at predetermined pressure, and is rotated driven by rotation of the photosensitive drum 4.

In the Embodiment 1, the developing device 7 is a reverse developing device of contact developing type which contains toner as a single-component developer having negative normal charging polarity (charging polarity for developing an electrostatic latent image). To the developing device 7, a developing roller 71 as a developer bearing member (rotatable member), a toner supplying roller 72, and a regulating blade 73 as a developer regulating member are provided. The toner supplying roller 72 is an elastic sponge roller in which a foaming member is formed around an outer periphery of an electroconductive core metal. The toner supplying roller 72 is disposed so as to contact the developing roller 71 with a predetermined penetrating amount.

(Image Forming Operation)

A video controller 30 executes bitmapping of character codes, halftoning processing of a half tone image by dithering, etc., based on information received from an external device (not shown) such as a host computer. The video controller 30 transmits a print signal and image information to a control portion (also a heating control portion) 31 as a control means. When the control portion 31 receives the image information, the image forming operation is initiated. Upon the image formation, in the image forming station 3Y, the photosensitive drum 4Y is rotated in the direction of the arrow. First, an outer peripheral surface (surface) of the photosensitive drum 4Y is uniformly charged by the charging roller 5Y, and the charged surface on the surface of the photosensitive drum 4Y is exposed by being irradiated by a laser light corresponding to image data by the exposure device 6 to form the electrostatic latent image.

The developing device 7Y supplies the toner to the electrostatic latent image on the photosensitive drum 4Y to visualize the electrostatic latent image as a toner image. The toner supplied by a toner supplying roller 72Y and held by a developing roller 71Y is made into a thin layer by the regulating blade 73Y and is used for the development. Here, the regulating blade 73Y has a function to regulate a layer thickness of the toner on the developing roller 71Y and also a function as a developer charging means to apply predetermined electric charge to the toner on the developing roller 71Y.

The developing roller 71Y is rotationally driven in a direction of an arrow in FIG. 1, which is the same as a moving direction of the surface of the photosensitive drum 4Y. In the Embodiment 1, the developing roller 71Y is rotationally driven at a speed in which a moving speed of a surface thereof is 140% of a moving speed of the surface of the photosensitive drum 4 in order to obtain an appropriate image density. In addition, the developing device 7Y is urged toward a photosensitive drum 4Y side by an unshown urging means, and as a result, the developing roller 71Y is urged against the photosensitive drum 4Y. By this, the surface of the developing roller 71Y is deformed to form a developing nip portion, and it becomes possible to perform stable development under a stable contacting state. As such, a Y toner image is formed on the surface of photosensitive drum 4Y by the developing device 7Y. The same image forming processes are performed at the image forming stations 3M, 3C and 3K. As a result, an M toner image is formed on a surface of the photosensitive drum 4M, a C toner image is formed on a surface of the photosensitive drum 4C, and a K toner image is formed on a surface of the photosensitive drum 4K, respectively.

An endless intermediary transfer belt 9, which is disposed along the lining direction of the image forming stations 3Y, 3M, 3C and 3K, is stretched around a driving roller 9*a*, a driven roller 9*b* and a driven roller 9*c*. The driving roller 9*a* rotates in a direction of an arrow in FIG. 1. By this, the intermediary transfer belt 9 is rotated and moved at a speed of 100 mm/sec along each image forming station 3Y, 3M, 3C and 3K.

On an outer peripheral surface (surface) of the intermediary transfer belt 9, the toner images of each color are sequentially overlapped (superimposed) and transferred by primary transfer rollers 10Y, 10M, 10C and 10K as primary transfer means, which are disposed in opposite to the photosensitive drums 4Y, 4M, 4C and 4K across the intermediary transfer belt 9, respectively. By this, a full-color toner image of the four colors are formed on the surface of the intermediary transfer belt 9.

The toner remaining on the surface of photosensitive drums 4Y, 4M, 4C and 4K after the primary transfer (hereinafter referred to as transfer residual toner) is removed by unshown cleaning blades, which are provided in cleaning devices 8Y, 8M, 8C and 8K, respectively. Through this, the photosensitive drums 4Y, 4M, 4C and 4K prepare for the next image formation.

Meanwhile, a recording material S accommodated and stacked in a feeding cassette 11, which is provided in a lower portion of the main body of the image forming apparatus P, is fed one by one from the feeding cassette 11 by a feeding roller 12, and is fed to a registration roller pair 13. The registration roller pair 13 feeds the fed recording material S to a transfer nip portion between the intermediary transfer belt 9 and a secondary transfer roller 14.

The secondary transfer roller 14 is disposed so as to face the driven roller 9*b* across the intermediary transfer belt 9. To the secondary transfer roller 14, voltage is applied from an unshown high-voltage power source when the recording material S passes through the transfer nip portion. By this, the full-color toner image is secondarily transferred from the surface of the intermediary transfer belt 9 to the recording material S passing through the transfer nip portion. Here, the photosensitive drum 4, the intermediary transfer belt 9 and the secondary transfer roller 14 described above constitute an image forming portion.

And the recording material S carrying the toner image is then conveyed to a fixing device F1 as a fixing means. The recording material S is then heated and pressed by passing through the fixing device F1, and the unfixed toner image is heated and fixed (immobilized) onto the recording material S. And the recording material S is discharged from the fixing device F1 to a discharge tray 15 outside the image forming apparatus (printer) P. The transfer residual toner on the surface of the intermediary transfer belt 9 after the secondary transfer is removed by an intermediary transfer belt cleaning device 16. Through this, the intermediary transfer belt 9 prepares for the next image formation.

(Fixing Device (Fixing Portion))

Next, the fixing device (fixing portion) F1 which fixes the toner image will be described. In the description below, for the fixing device F1 and members constituting the fixing device F1, a longitudinal direction is a direction perpendicular to a conveyance direction Dr (see FIG. 2) of the recording material S on a surface of the recording material S. A widthwise direction is a direction parallel to the conveyance direction of the recording material S on the surface of the recording material S. A width is a dimension in the widthwise direction. For the recording material S, a longitudinal width is a dimension in the direction perpendicular to the conveyance direction of the recording material S on the surface of the recording material S.

Figure 2:
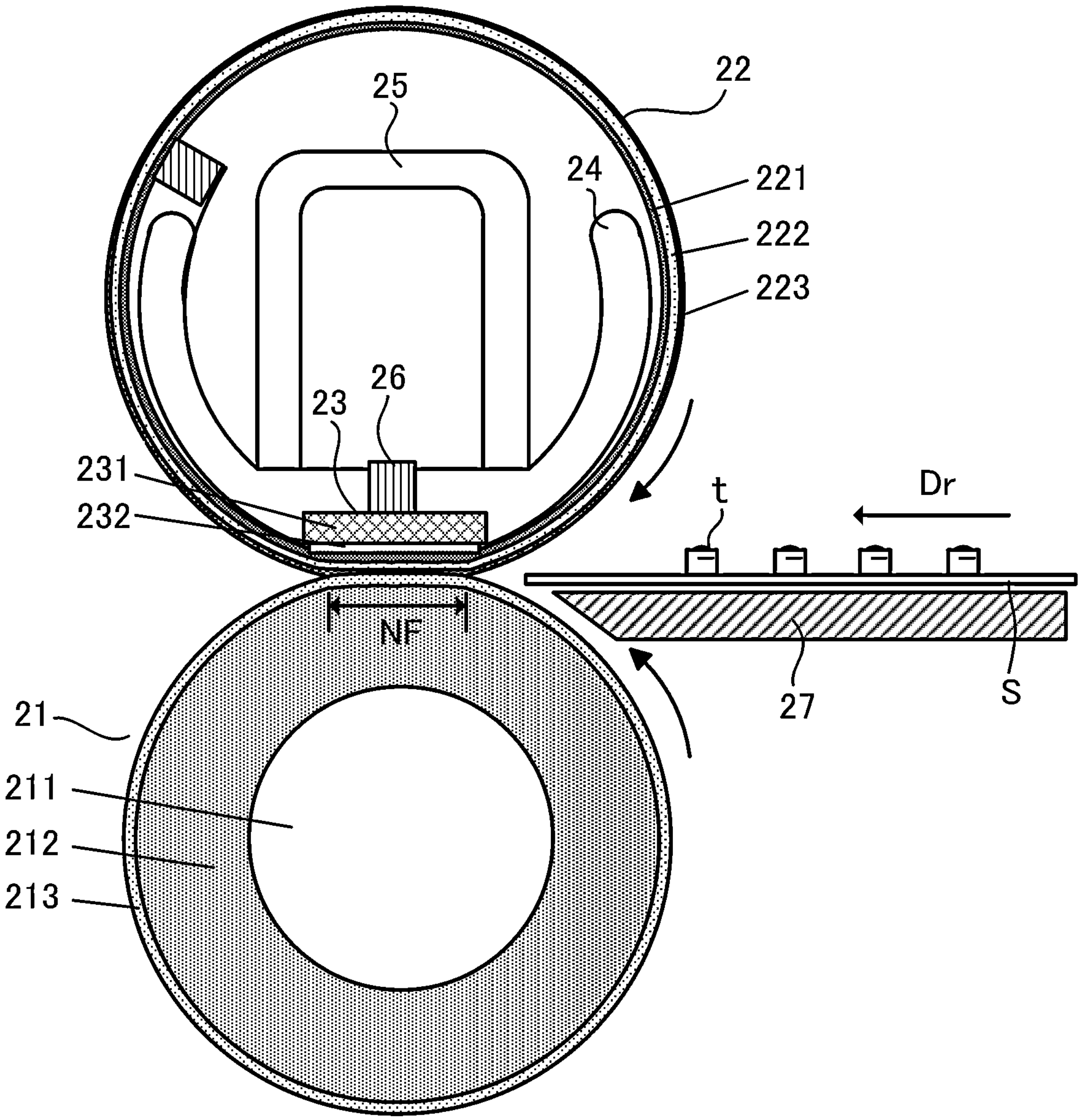
FIG. 2 is a view illustrating a cross-sectional configuration of a fixing device in the Embodiments 1 through 3.

FIG. 2 is a lateral cross-sectional schematic view of the fixing device F1. The fixing device F1 rotationally drives a pressing roller 21 as an opposing member (pressing member), which forms a nip portion nipping and conveying the recording material S in a pressed state with a fixing film 22, and rotates the fixing film 22 with conveyance force of the pressing roller 21. That is, the fixing device F1 is a device of a so-called tensionless type of a so-called film heating type and a pressing roller driving type.

The fixing device F1 described in the Embodiment 1 includes the pressing roller (pressing member) 21, the fixing film (fixing member) 22, a heater (heating member) 23, a heater holder (heating member holding member) 24, a rigid stay (rigid member) 25, etc. The pressing roller 21, the fixing film 22, the heater 23, the heater holder 24 and the rigid stay 25 are all elongated members extended in the longitudinal direction.

The heater 23 includes a ceramic substrate 231, which is elongated in the longitudinal direction and has heat resistance, insulation and good heat conductivity. And a resistance heat generating member (not shown) is formed and equipped along the longitudinal direction in a central portion of the widthwise direction on a front side (the pressing roller 21 side) of the substrate 231. Power supply electrodes (not shown) are provided inside both ends in the longitudinal direction of the substrate 231 to supply power to the resistance heat generating member. Then, an overcoat layer 232 having heat resistance is provided on the front side of the substrate 231 so as to cover a surface of the resistance heat generating member (not shown).

The fixing film 22 is formed in a cylindrical shape and made by flexible heat-resistant resin material. An outer peripheral length of the fixing film 22 is 57 mm. The fixing film 22 includes a polyimide layer with a thickness of 50 micron as a cylindrical base layer 221 and an elastic layer 222, which is made by silicone rubber with a thickness of 200 micron and formed around an outer periphery of the base layer 221. And the fixing film 22 includes a releasing layer 223 of fluorine resin with a thickness of 15 micron on an outer periphery of the elastic layer 222, which gives a non-adhesive property against the toner thereto.

An inner peripheral length of the fixing film 22 is 3 mm longer than an outer peripheral length of the heater holder 24, which holds the heater 23. And the fixing film 22 is loosely fitted to the heater holder 24 with a margin to the peripheral length of the heater holder 24, which holds the heater 23. That is, the fixing film 22 contains the heater 23. The rigid stay 25 is constituted by a rigid member having a cross-sectional shape of downward U-shape. The rigid stay 25 is disposed in a center in a widthwise direction of an upper surface of the heater holder 24.

In FIG. 2, the pressing roller 21 includes a round shaft-shaped core metal 211, an elastic layer 212 which is made of silicone rubber and formed concentrically with the core metal 211 on an outer periphery of the core metal 211, and a releasing layer 213 which is made of conductive fluorine resin and formed around the elastic layer 212. An outer peripheral length of the pressing roller 21 is 63 mm. Incidentally, the elastic layer 212 may be what is made by foaming heat-resistant rubber such as fluorine rubber, silicone rubber or the like. The releasing layer 213 may be an insulating fluorine resin.

The pressing roller 21 is disposed in parallel with the fixing film 22 below the fixing film 22 and both end portions in a longitudinal direction of the core metal 211 are held freely for rotation via a bearing member. And the core metal 211 of the pressing roller 21 and the rigid stay 25 are pressed by an unshown pressing spring at both end portions in the longitudinal direction so that an outer peripheral surface (surface) of the pressing roller 21 and an outer peripheral surface (surface) of the fixing film 22 are in contact with each other. By that pressing force, the surface of the pressing roller 21 and the surface of the fixing film 22 are made to be in contact with each other, and a fixing nip portion NF having a predetermined width, which nips and conveys the recording material S, is formed between the surface of the pressing roller 21 and the surface of the fixing film 22. Total pressing force is 20 kgf.

A fixing operation of the fixing device F1 will be described using FIG. 2 and parts of FIG. 1 and FIG. 3. In response to a print command, the pressing roller 21 is rotated in a direction of an arrow in FIG. 2 at a predetermined process speed by an unshown rotation control portion (drive control means). The fixing film 22 is rotated in a direction of an arrow in FIG. 2 along the outer periphery of the heater holder 24 driven by frictional force with the surface of the pressing roller 21 in the fixing nip portion NF while an inner peripheral surface of the fixing film 22 is in contact closely with and slides against the heater 23. In addition, the control portion 31, which functions as a power supply control means (temperature control portion, heating control portion), supplies power to the resistance heat generating member of the heater 23 in response to the print command. By the power supply, temperature of the heater 23 is raised and the fixing film 22 is heated.

The temperature of the heater 23 is detected by a temperature detecting element 26 as a temperature detecting means such as a thermistor provided on a back surface side of the substrate 231 of the heater 23. The control portion 31 controls the power supply to the resistance heat generating member so that the heater 23 maintains a predetermined temperature (heating temperature under heating control) T based on an output signal from the temperature detecting element 26. By this, the fixing nip portion NF is maintained at the predetermined temperature T.

The recording material S carrying an unfixed toner image t is introduced into the fixing nip portion NF through a fixing entrance guide 27, and is nipped and conveyed by the surface of the pressing roller 21 and the fixing film 22. During the conveying process, heat and pressure of the fixing film 22 are applied to the recording material S, and the unfixed toner image t is heated and fixed on a surface of the recording material S.

As described above, the toner image t is formed in order of Y, M, C and K according to the disposed order of the image forming stations 3, and the colors are overlapped on the intermediary transfer belt 9 in order of Y, M, C and K from a belt side. When transferred sequentially to the recording material S (secondary transfer), the toner image t secondarily transferred to the recording material S becomes an image formed overlappingly in order of K, C, M and Y from a recording material S side. When the image overlapped with all four colors is sent to the fixing device F1, Y toner formed at the first image forming station is formed on a fixing film 22 side. And the Y toner contacts the fixing film 22, and K toner formed at the fourth image forming station is formed on the recording material S side and on a pressing roller 21 side, and contacts the recording material S.

(Process Cartridge Memory)

Figure 3:
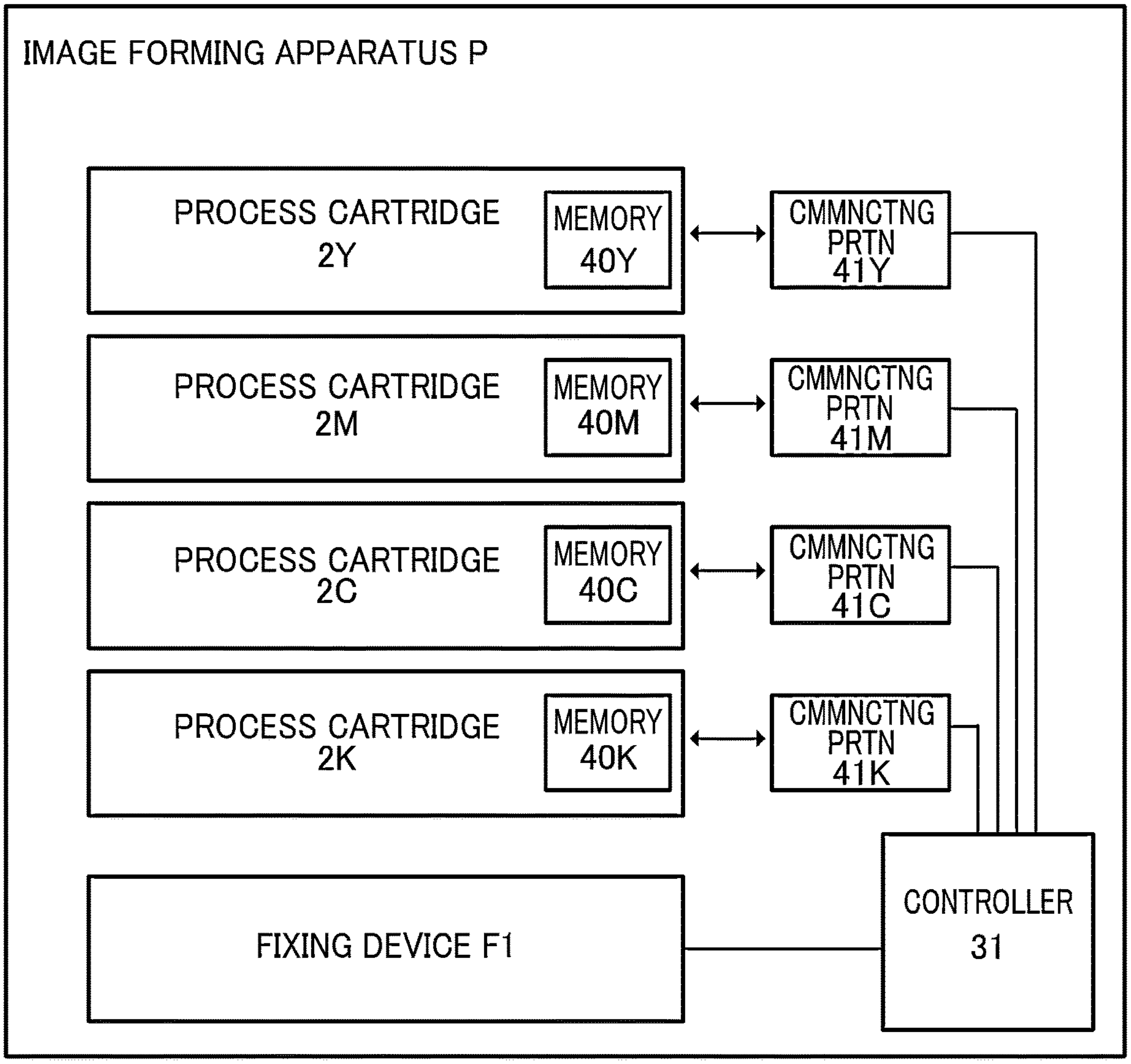
FIG. 3 is a view illustrating memories and communicating portions of process cartridges in the Embodiments 1 through 3.

FIG. 3 is a view illustrating memories and communicating portions of the process cartridges 2 in the Embodiment 1. On surfaces of frame members of the process cartridges 2Y, 2M, 2C and 2K of each Y, M, C and K, memories 40Y, 40M, 40C and 40K as storage media are provided. On a main body portion side of the image forming apparatus P, communicating portions 41Y, 41M, 41C and 41K, which performs sending and receiving of signals with the memories 40Y, 40M, 40C and 40K, respectively, are provided. It is configured so as to be able to perform writing and reading information from the control portion 31 provided in the image forming apparatus P to the memory 40 via the communicating portion 41.

In the Embodiment 1, "usage history values" LY, LM, LC and LK, which change depending on use of the developing devices 7Y, 7M, 7C and 7K from an initial use, are written at any time and stored in the memories 40Y, 40M, 40C and 40K, respectively. In the Embodiment 1, the "usage history value" L is defined as a total running distance of the developing roller 71. The control portion 31 calculates a distance which the surface of the developing roller 71 has moved based on peripheral speed of the surface of the developing roller 71 and a rotation time and integrates the calculated results from an initial use (a time when use began) of the process cartridge 2 to obtain the total running distance, and writes the result into the memory 40. Each one meter of the total running distance, it is written as the "usage history value" one. In the developing device 7 of the process cartridge 2, the toner supplied by the toner supplying roller 72 and held by the developing roller 71 is rubbed against the regulating blade 73. In addition, since the surface of the developing roller 71 is rotationally driven with a difference in speed relative to the surface of the photosensitive drum 4, the toner held on the developing roller 71 is rubbed against the photosensitive drum 4 as well. As the total running distance of the developing roller 71 increases, a number of times and the distance in which the toner is subjected to mechanical stress due to the rubbing increase.

The "usage history value" L may be values, for example, in which the rotation time, a number of rotation and a rotation distance of each unit such as the photosensitive drum 4 and the developing roller 71 are integrated respectively. In addition, the "usage history value" L may be a remaining amount of the toner or a number of printed sheets. Furthermore, the "usage history value" L may also be resistance value of each member of the printer 1, which changes depending on temperature and humidity environment in which the process cartridge 2 is operated, the remaining amount of the toner (remaining amount of the developer) accommodated in the developing device 7, etc.

In addition, the "usage history value" L may be a combination of these parameters and it is also possible to combine after weighting certain parameters. In other words, a type of the "usage history value" is not limited as long as it is a parameter which can be read by the control portion 31 via the communicating portion 41 and changes depending on the use of the developing device 7 from the initial use.

In addition, in the Embodiment 1, the developing device 7 is held in the process cartridge 2, however, the present invention is an invention for a phenomenon which occurs as the developing performance changes depending on changes in the usage history value of the developing device 7. Therefore, it is possible to apply to an image forming apparatus other than the process cartridge type as well and, for example, it is possible to obtain the same effect as in the Embodiment 1 even in a configuration in which the toner is replenished as long as it is a configuration in which the developing performance changes depending on the changes in the usage history value of the developing device 7.

(Toner)

The toner in the Embodiment 1 has a configuration in which, a surface of a toner base material, of which main component (main material) is thermoplastic resin, is coated by particles of non-melting material, which has a higher melting point than the thermoplastic resin, being adhered thereto. The toner base material may contain a coloring agent, wax, a charge control agent, etc. Magnetic members, etc. may also be contained.

In the fixing process, temperature of the toner on the recording material S reaches approximately from 70° C. to 150° C. Here, within such a temperature range, a portion which expresses adhesive performance is referred to as a meltable toner base material, and a portion which does not express the adhesive performance or whose adhesive performance is sufficiently low relative to the toner base material is referred to as a non-melting material.

The particles on the surface of the toner are provided as a means for improving fluidity, chargeability and transferability. Examples of means for adhering the particles to the surface of the toner include a mean which adheres the particles with shear force in a subsequent process, a mean which utilizes chemical bonding, and a mean in which the particles are formed as a part of a surface layer of the toner. Here, for convenience, all of the particles attached to or formed on the surface of the toner are referred to as external additives. As the external additives, the non-melting material such as silica and silicon compounds are often used, and the non-melting material affect the fixing performance.

If the surface of the toner is coated largely with the non-melting material, a real contact area, in which the toner base material contacts the recording material S and the surface of the fixing film 22 in the fixing process, is reduced. Here, a ratio in which the surface of the toner is covered by the non-melting material is defined as coated ratio. The real contact area referred here is a contact area between the meltable toner base material, excluding an area coated by the non-melting material, and surfaces of the members such as the recording material S and the fixing film 22 in the fixing process. If the real contact area is small, then the toner base material will no longer contact closely with the surface of mating material, resulting in less adhesive force or bonding force. In the Embodiment 1, a method for determining an appropriate fixing temperature for the toner, in which the coated ratio by the non-melting material decreases as the usage history of the process cartridge 2 gets long, with a configuration in which the surface of the toner base material is coated by the external additives including the non-melting material is provided.

For the toner to which the external additives are solidly fixed with high coated ratio from a time of manufacturing, the coated ratio tends to decrease as the usage history of the process cartridge 2 gets long. For example, there are toner in which hemispherical external additives are chemically formed on the surface of the toner base material, toner in which the external additives are half embedded thereon, toner in which the external additives are chemically bonded thereto, etc. These external additives are difficult to be embedded against the surface of the base material, but a large outer diameter thereof makes the external additives prone to be peeled off due to mechanical stress in the developer container. In addition, since these external additives are highly effective in preventing the toner from contacting other materials, it affects greatly when the coated ratio decreases.

(Fixing Defect and Occurring Mechanism Thereof)

In the fixing process, when the toner on the recording material S is heated and fixed in the fixing nip portion NF and discharged from the fixing nip portion NF, there may be a case in which the adhesive force between the recording material S and the toner is insufficient and the adhesive force between the fixing film 22 and the toner may exceed it. If this happens, fixing defect, in which the toner on the recording material S is transferred to the fixing film 22 side, occurs. The adhesive force between the toner and the surface of the fixing film 22 and between the toner and the surface of the recording material S can be considered in terms of the following two factors.

Total adhesive force=adhesive force generated per unit contact area×real contact area The adhesive force generated per unit contact area is determined by surface property and chemical releasing property of surface material of a member. For the surface of the fixing film 22 in the Embodiment 1, material with a smooth surface, non-adhesiveness and low surface energy is used. On the other hand, the recording material S is a paper constituted by fibers and fillers, etc., and has no non-adhesiveness but has large irregularities. Therefore, the adhesive force generated per unit contact area between the toner and the recording material S is greater than that with the fixing film 22.

Primary parameters of the real contact area is the coated ratio by the non-melting material of the toner, temperature characteristics of viscoelasticity of the toner and temperature of the toner. The temperature characteristics of viscoelasticity of the toner is a degree to which the toner melts and viscoelasticity thereof changes depending on temperature. When the coated ratio by the non-melting material is low, the real contact area becomes larger, and when the toner base material is melted and deformed, it becomes easier for the toner to contact closely with an object and the real contact area becomes larger.

Figure 4:
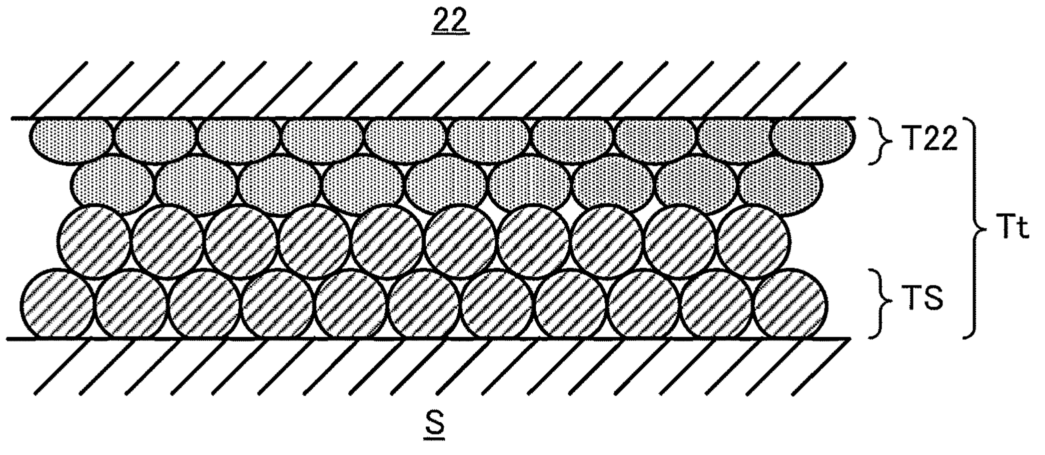
FIG. 4, part (a) and part (b), is a schematic view illustrating an example of a toner layer heated in a fixing nip portion in the Embodiment 1, and a view showing results of an Experiment 1.
Figure 4:
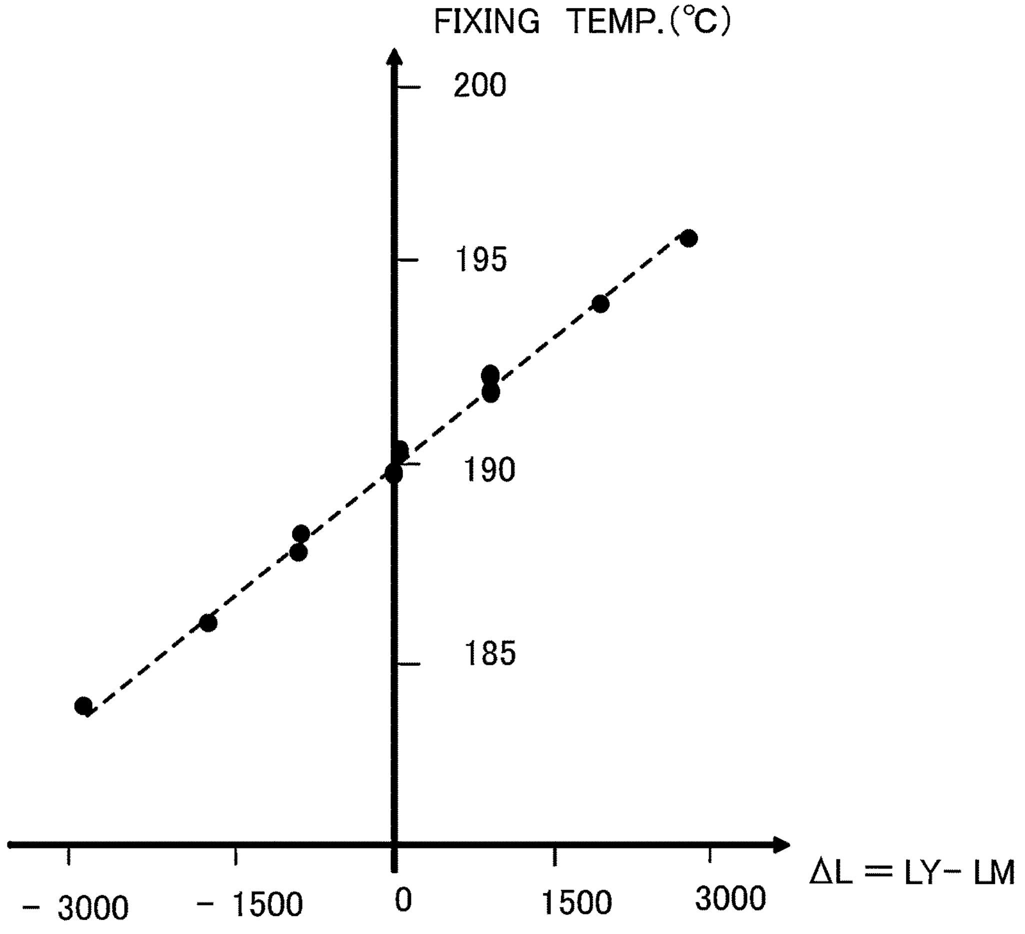

In a full-color image forming apparatus which overlappingly forms a plurality of the toner, two or more layers of the toner may be layered on the recording material S, and there may be a case in which the toner contacting the fixing film 22 and the toner contacting the recording material S is different in the fixing nip portion NF. Part (a) of FIG. 4 is a schematic view illustrating an example of heated toner layers in the fixing nip portion NF. Due to difference between toner T22 (Tt) contacting the fixing film 22 and toner TS (Tt) contacting the recording material S, difference in temperature, etc., there may be a case in which the real contact area between the fixing film 22 and the toner T22 and the real contact area between the recording material S and the toner TS differs.

Between the fixing film 22 and the recording material S, the adhesive force occurring per unit contact area is less on the fixing film 22 side, however, if there is a large difference in the real contact areas between the fixing film 22 and the recording material S, fixing defect will occur. In such a case, it is necessary to raise the fixing temperature to increase melting deformation amount of the toner.

Upon raising the fixing temperature and applying more heat to the toner, both the toner contacting the fixing film 22 and the toner contacting the recording material S is melted and deformed. However, the adhesive force on the recording material S side, in which the adhesive force generated per unit contact area is large, increases significantly, but an increasing amount of the adhesive force on the fixing film 22 side, in which the adhesive force generated per unit contact area is small, is small. In addition, since there is a geometrical limit for melting deformation, it begins to show saturating tendency from certain degree of deformation. At a certain fixing temperature, the adhesive force on the recording material S side exceeds that on the fixing film 22 side, and it becomes possible to fix without the fixing defect.

However, in a condition in which the real contact area between the toner and the fixing film 22 is likely to be greater than the real contact area between the toner and the recording material S, the required fixing temperature becomes higher. In a condition in which the real contact area between the toner and the fixing film 22 is less likely to be greater than the real contact area between the toner and the recording material S, the required fixing temperature becomes lower.

In the full-color image forming apparatus which overlappingly forms a plurality of the toner, there may be a case in which the toner contacting the fixing film 22 and the toner contacting the recording material S differs, and then the coated ratio by the non-melting material and/or the temperature characteristics of the viscoelasticity of the toner differ. In addition, the coated ratio by the non-melting material also varies depending on use condition of the process cartridge 2, etc. This is because the non-melting material such as external additives is peeled off and the coated ratio decreases due to stress the toner receives in the developing device 7.

Since a consumed amount of the toner at each image forming station 3 varies depending on an output image, a timing of replacement of each process cartridge 2 may also vary from one image forming station 3 to another. The usage history of each process cartridge 2 also varies from one image forming station 3 to another.

The decrease in the coated ratio by the non-melting material of the toner contacting the fixing film 22 leads to an increase in the real contact area with the fixing film 22, and it is a change in a direction of generating the fixing defect. The decrease in the coated ratio by the non-melting material of the toner contacting the recording material S leads to an increase in the real contact area with the recording material S, and it is a change in a direction of suppressing the fixing defect.

(Experiment 1)

An experiment to examine changes in the fixing temperature, at which the toner can be fixed without fixing defect, depending on the usage history value L of the process cartridge 2 which supplies the toner contacting the fixing film 22 side and the usage history value L of the process cartridge 2 which supplies the toner contacting the recording material S side was performed. The usage history value L is the total running distance of the developing roller 71. The process speed of the image forming apparatus used in the experiment is 100 mm/s, and an interval (sheet interval) between a preceding recording material S and the next recording material S is 30 mm. The experiment is conducted with the image forming apparatus being placed in an environment with environment temperature of 23° C. and humidity of 50%. For the experiment, a general LBP printing paper with a basis weight of 80 g/m$^2$ and an LTR size (width 216 mm and length 279 mm) is used.

An image used for evaluating the fixing performance is a secondary solid color image with 100% Y toner on top of 100% M toner. The M toner contacts the recording material S and the Y toner contacts the fixing film 22. Process cartridges 2M for the M toner, which have different usage history values LM, and process cartridges 2Y for the Y toner, which have different usage history values LY, are prepared, and images are formed with combinations of each process cartridge. The experiment was conducted by changing the fixing temperature of the fixing device F1 to find the lowest fixing temperature at which it is possible to fix without the fixing defect. Starting from a condition in which detected temperature by the temperature detecting element 26 of the heater 23 of the fixing device F1 is 23° C., 10 continuous printings are performed, and a fifth printed image is evaluated.

Part (b) of FIG. 4 summarizes the results of the experiment 1. The horizontal axis represents a difference between the usage history value LY and the usage history value LM, ΔL=LY−LM. The vertical axis represents the fixing temperature (° C.) at which the fixing can be done without the fixing defect. The required fixing temperature gets higher in proportion to the difference between the usage history values ΔL. The greater the difference between the usage history value LY of the process cartridge 2Y, which supplies the Y toner contacting the fixing film 22 side, and the usage history value LM of the process cartridge 2M, which supplies the M toner contacting the recording material S side, the higher the required fixing temperature. This is because the toner contacting the fixing film 22 side has a longer usage history than the toner contacting the recording material S side, and as a result of being subjected to stress in the developing device 7 for a longer period of time, the coated ratio by the non-melting material such as the external additives decreased.

Determination Method of the Fixing Temperature in the Embodiment 1

Figure 5:
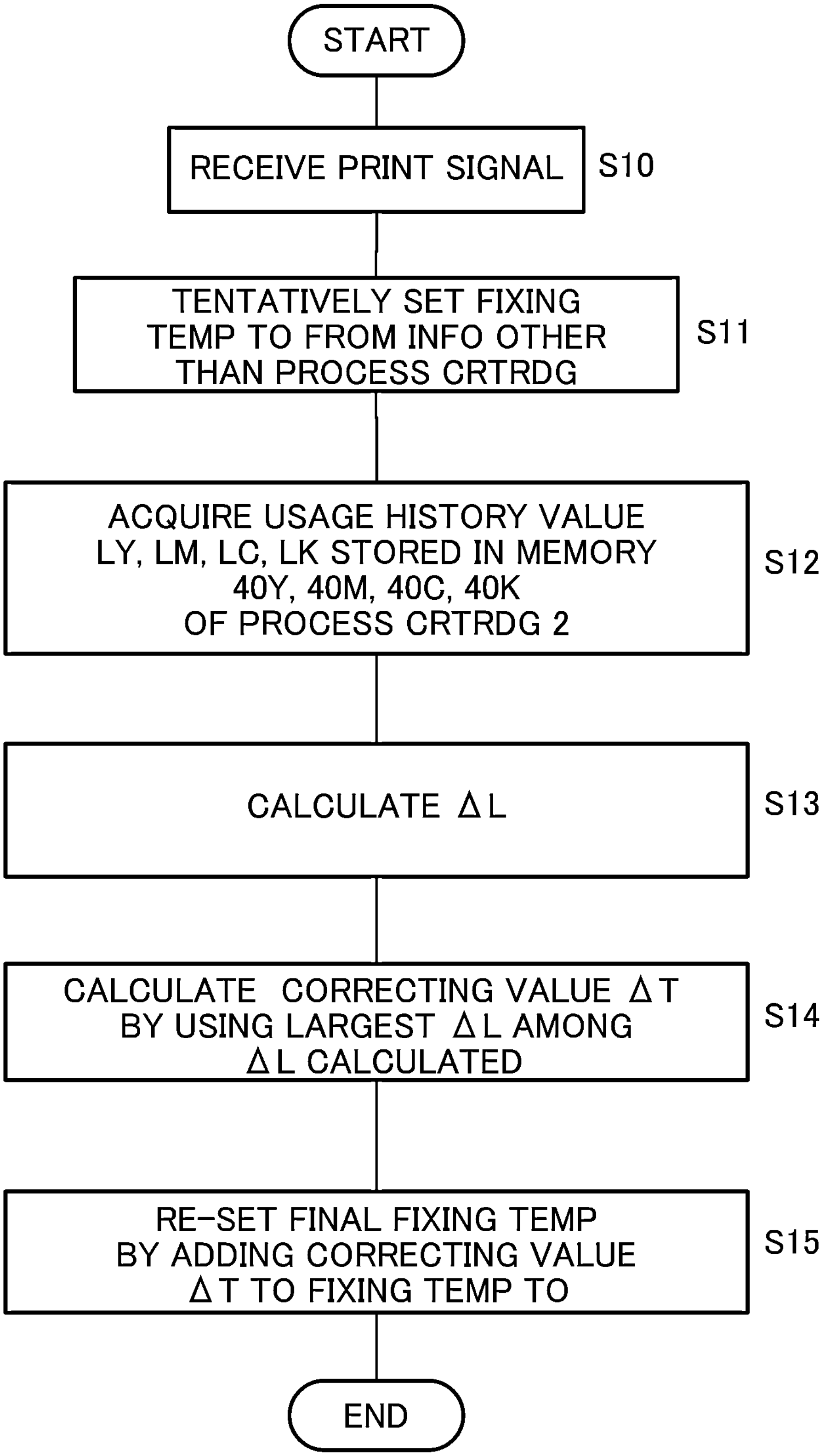
FIG. 5 is a flowchart illustrating a determination method of a fixing temperature in the Embodiment 1.

In the Embodiment 1, the usage history values LY, LM, LC and LK stored in the memories 40Y, 40M, 40C and 40K of the process cartridges 2 of each image forming station are referred, and the fixing temperature is set corresponding to the usage history of each station. Determination method of the fixing temperature in the Embodiment 1 is illustrated in a flowchart in FIG. 5. In step (hereinafter referred to as S) 10, the control portion 31 receives a print signal. In S11, the control portion 31 tentatively sets a fixing temperature TO from information other than the process cartridge 2, such as on a print sheet, an image size, image forming apparatus, the usage history of the fixing device, and the environment temperature.

In S12, the control portion 31 acquires the usage history values LY, LM, LC and LK stored in the memories 40Y, 40M, 40C and 40K of the process cartridges 2 for each image forming station, respectively. In S13, the control portion 31 calculates ΔL between each color, i.e., performs the following six calculations.

$$\Delta L = LY - LM$$

$$\Delta L = LY - LC$$

$$\Delta L = LY - LK$$

$$\Delta L = LM - LC$$

$$\Delta L = LM - LK$$

$$\Delta L = LC - LK$$

In S14, the control portion 31 uses the largest ΔL among the ΔL calculated in S13 to calculate a correcting value for the fixing temperature ΔT using the following equation.

Correcting value for the fixing temperature $\Delta T$(° C.)=correcting coefficient×ΔL In the Embodiment 1, the correcting coefficient is set to 0.002 (° C.).

In S15, the control portion 31 adds the correcting value ΔT obtained in S14 to the fixing temperature TO tentatively set in S11 (T0+ΔT) to re-set a final fixing temperature.

Depending on an image, there is a case in which toner of all four colors is combined. Particularly having significant effect on the fixing performance is the toner contacting the fixing film 22 side and the toner contacting the recording material S side. Hereinafter, the toner contacting the fixing film 22 side is referred to as an upper layer toner and the toner contacting the recording material S side is referred to as a lower layer toner. In other words, in the toner image overlappingly formed on the recording material S, of the toner overlapped on the recording material, the toner of the toner image formed nearest to the recording material S is defined as the lower layer toner, and the toner of the toner image formed farthest from the recording material S is defined as the upper layer toner. In the Embodiment 1, ΔL is defined as "the usage history value of the upper layer toner L—the usage history value of the lower layer toner L".

In a case in which ΔL takes a positive value, the usage history of the process cartridge 2 for the upper layer toner is longer than that of the process cartridge 2 for the lower layer toner. In other words, the upper layer toner is subjected to more stress in the developing device 7 than the lower layer toner, and there is a high possibility that the coated ratio of the upper layer toner is decreased. The upper layer toner, which is under a condition where the real contact area is easy to be increased, has a disadvantage in fixing performance when the toner is layered, therefore the fixing temperature needs to be raised. On the other hand, in a case in which ΔL takes a negative value, there is room to lower the fixing temperature.

Calculation Example of the Correcting Value for the Fixing Temperature in the Embodiment 1

According to the determination method of the correcting value for the fixing temperature in the Embodiment 1, the correcting values for the fixing temperature are calculated with a set of the process cartridges 2 having different usage history values L. The usage history values L of the process cartridges 2 used and the calculated correcting values for the fixing temperature ΔT are shown in Table 1.

TABLE 1

| | Usage history value L | | | | ΔT (° C.) in the |
|---|---|---|---|---|---|
| | LY | LM | LC | LK | Embodiment 1 |
| Set 1 | 0 | 0 | 0 | 0 | 0 |
| Set 2 | 3000 | 3000 | 3000 | 3000 | 0 |
| Set 3 | 3000 | 3000 | 3000 | 0 | +6 |
| Set 4 | 0 | 3000 | 3000 | 3000 | 0 |
| Set 5 | 0 | 1000 | 2000 | 3000 | −2 |

A set 1 in the Embodiment 1 is a case in which all of the process cartridges 2 are new. In this case, the correcting value for the fixing temperature ΔT is 0. A set 2 is a case in which all of the process cartridges 2 are used equally. In this case, the correcting value for the fixing temperature ΔT is 0.

A set 3 is a case in which the process cartridge 2K of K is replaced with a new one and the usage history value LK is reset to 0. The correcting value for the fixing temperature ΔT is calculated to be +6° C. In this case (the set 3), the coated ratio by the non-melting material of the K toner is higher than that of the rest of the toner. In an image in which a plurality of colors of the toner including the K toner are used, the K toner is the lowest layer toner. Compared to the fixing film 22, the real contact area of the lowest layer toner to the recording material S is easier to be decreased, thereby requiring the higher fixing temperature.

A set 4 is a case in which the process cartridge 2Y of Y is replaced with a new one and the usage history value LY is reset to 0. The correcting value for the fixing temperature ΔT is calculated to be 0° C. In this case (the set 4), the coated ratio by the non-melting material of the Y toner is higher than that of the rest of the toner. In an image in which a plurality of colors of the toner including the Y toner are used, the Y toner is the uppermost layer toner. Compared to the recording material S, the real contact area of the uppermost layer toner to the fixing film 22 is easier to be decreased and the fixing temperature can be lowered. However, there is no change in the required fixing temperature for an image in which a plurality of colors of the toner which do not contain the Y toner are used. Therefore, in the set 4 in the Embodiment 1, the fixing temperature is not changed.

A set 5 is a case in which the process cartridge which supplies the toner for a lower layer has the greater usage history value L (i.e., LK>LC>LM>LY). The correcting value for the fixing temperature ΔT is −2° C. In all combinations of the toner, the coated ratio by the non-melting material of the toner for a lower layer is lower than that of the toner for an upper layer. Because of this, the fixing temperature can be lowered.

(Comparison to a Conventional Example)

As a comparative examination to the Embodiment 1, a case in which the fixing temperature is determined according to a conventional determination method for the fixing temperature with the same set of the process cartridges 2 having different usage history values L as calculated in the Embodiment 1 is examined. The usage history values L of the process cartridges used are the same as in Table 1 in the Embodiment 1. As a Conventional Example 1, the fixing temperature is not determined using the usage history values L in the memories 40 of the process cartridges 2, but the process cartridges 2 are always operated at a fixing temperature which is acceptable even under the most unfavorable condition. For example, the process cartridges 2 are always operated at the correcting value for the fixing temperature +6° C. In this case, no fixing defect occurs in the set 3, but it is an excessive (excessively high) fixing temperature setting for cases of the set 1, the set 2, the set 4 and the set 5.

As a Conventional Example 2, the fixing temperature is determined by selecting the largest usage history value L among the four colors within a replacement life of the process cartridge 2. In all of the set 2, the set 3, the set 4 and the set 5, the largest usage history value is 3000, and therefore the same fixing temperature is set in all the sets. In this case, an appropriate fixing temperature cannot be set for a set in which the fixing temperature should be raised and for a set in which the fixing temperature should be lowered.

As a Conventional Example 3, among the four colors, the lowest usage history value L (0) is selected to determine the fixing temperature. In all of the set 1, the set 3, the set 4 and the set 5, the same fixing temperature is set. In this case as well, an appropriate fixing temperature cannot be set for a set in which the fixing temperature should be raised and for a set in which the fixing temperature should be lowered.

Modified Examples of the Embodiment 1

The temperature characteristics of the viscoelasticity of the toner base material and the adhesive force exhibited by the base material can vary depending on a coloring agent, wax, or other material which are used, and therefore all of those properties of each color may not be the same. In addition, it is also known that Y is most likely to be formed at the uppermost layer and K is most likely to be formed at the lowest layer. By intentionally changing the temperature characteristics of the viscoelasticity of the toner, it becomes possible to limit combinations of unfavorable fixing performance.

In the Embodiment 1, under an assumption that the fixing performance in all combinations of colors is equal upon beginning of use of the process cartridges 2, the correcting value for the fixing temperature ΔT is determined by estimating changes in the fixing temperature since the beginning of use. Even in an early period of use, however, the required fixing temperatures are not necessarily the same for all combinations of colors and in a case in which the most unfavorable combinations are limited, the correcting value for the fixing temperature ΔT may be determined by calculating the difference in the usage history values L of the process cartridges 2 only for those limited combinations.

For example, in a case in which a combination of Y and M and a combination of M and C are the configurations in which the fixing performance is the most unfavorable, the following two calculations are performed and the correcting value for the fixing temperature ΔT is determined by using the largest ΔL.

$$\Delta L = LY - LM$$

$$\Delta L = LM - LC$$

When conditions are limited in this manner, a number of cases in which the fixing temperature needs to be raised will be limited, and a number of cases in which the fixing temperature can be lowered will be increased.

SUMMARY

As described above, the fixing temperature is determined by using the difference between the usage history value of the process cartridge 2 which supplies the toner contacting the fixing film 22 side and the usage history value of the process cartridge 2 which supplies the toner contacting the recording material S side. By this, even for the images in which a plurality of the toner layers are overlappingly formed, it becomes possible to set an appropriate fixing temperature corresponding to the changes in the toner.

In the Embodiment 1, the first image forming station is for Y, followed by M, C and K, however, the effect of the Embodiment 1 is not limited by order of colors. By determining the fixing temperature using the usage history values L of the process cartridges 2 which supply the upper layer toner and the lower layer toner, an appropriate fixing temperature can be set.

As described above, according to the Embodiment 1, it becomes possible to set an appropriate fixing temperature corresponding to the changes in each toner to reduce the fixing defect, even for the image in which a plurality of the toner layers are overlappingly formed on the recording material.

Embodiment 2

In an Embodiment 2, an image forming apparatus to which the present invention is applied is the same as in the Embodiment 1, however, toner used in an image is determined by an image processing means, and the difference in the usage history values L of the process cartridges is used to determine an appropriate fixing temperature.

(Image Processing Portion)

Figure 6:
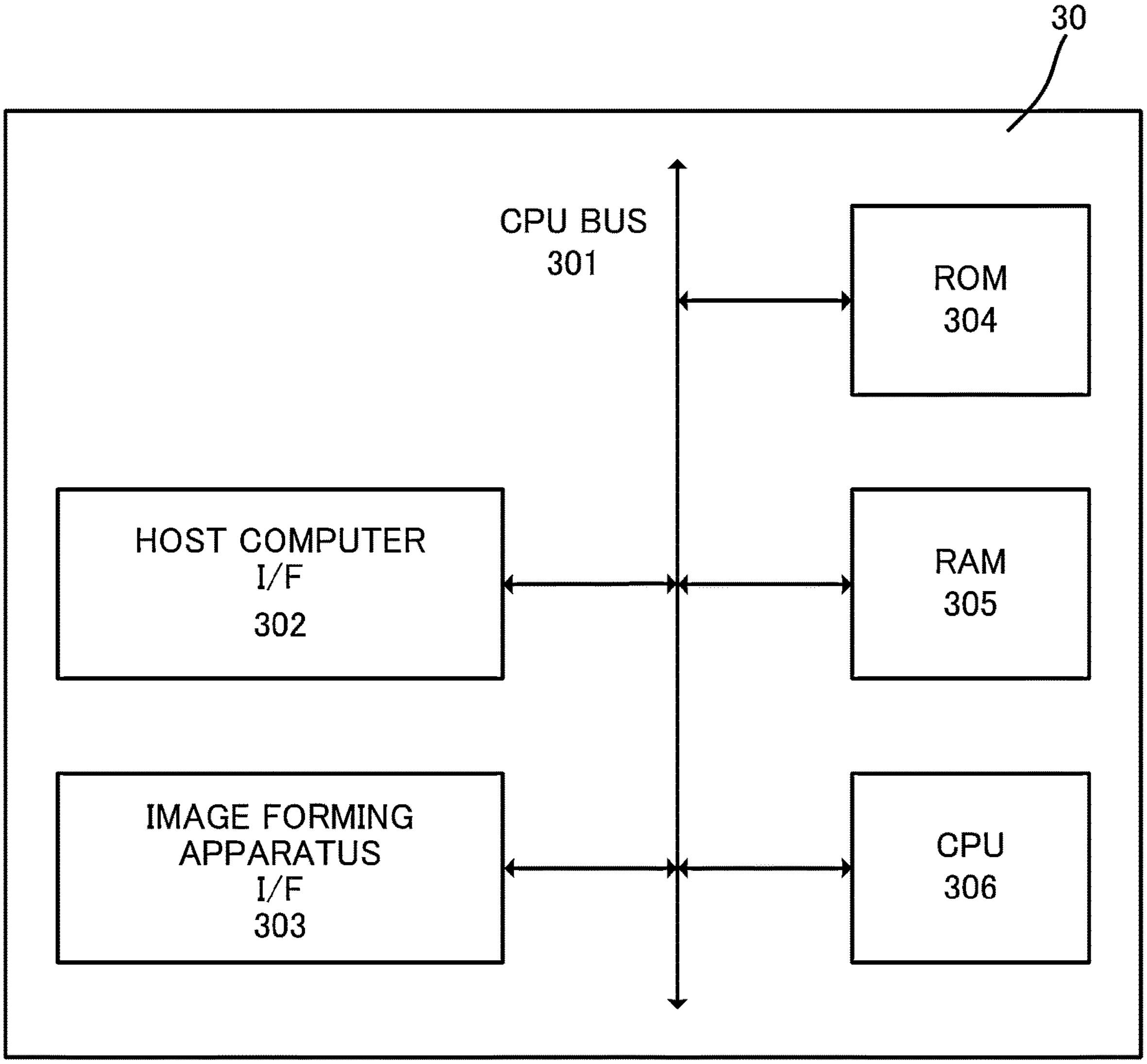
FIG. 6 is a view illustrating an image processing portion in the Embodiment 2.

A video controller 30 as an image processing portion (image processing means) will be described using FIG. 6. The video controller 30 is provided with various devices such as a host computer interface (I/F) portion 302, an image forming apparatus interface portion 303, a ROM 304, a RAM 305 and a CPU 306, which are connected to each other via a CPU bus 301. The CPU bus 301 includes an address, data and a control bus. The host computer I/F portion 302 includes a function which bi-directionally communicates and connects with a data transmission device such as a host computer via a network. The image forming apparatus I/F portion 303 includes a function which bi-directionally communicates and connects with the image forming apparatus P.

The ROM 304 stores control program codes to execute an image data processing described below and other processing. The RAM 305 is a memory for storing bitmap data and image density information resulting from rendering image data received from the image forming apparatus I/F portion 303 and for storing a temporary buffer area and various processing statuses. The CPU 306 controls each device connected to the CPU bus 301 based on the control program codes stored in the ROM 304. The video controller 30 in the Embodiment 2 is the image processing means (image processing portion) which generates an image signal for an image formation based on the received image data, and it is also an image analyzing means (image analyzing portion) which acquires density information of the toner image.

(Image Data Processing)

Figure 7:
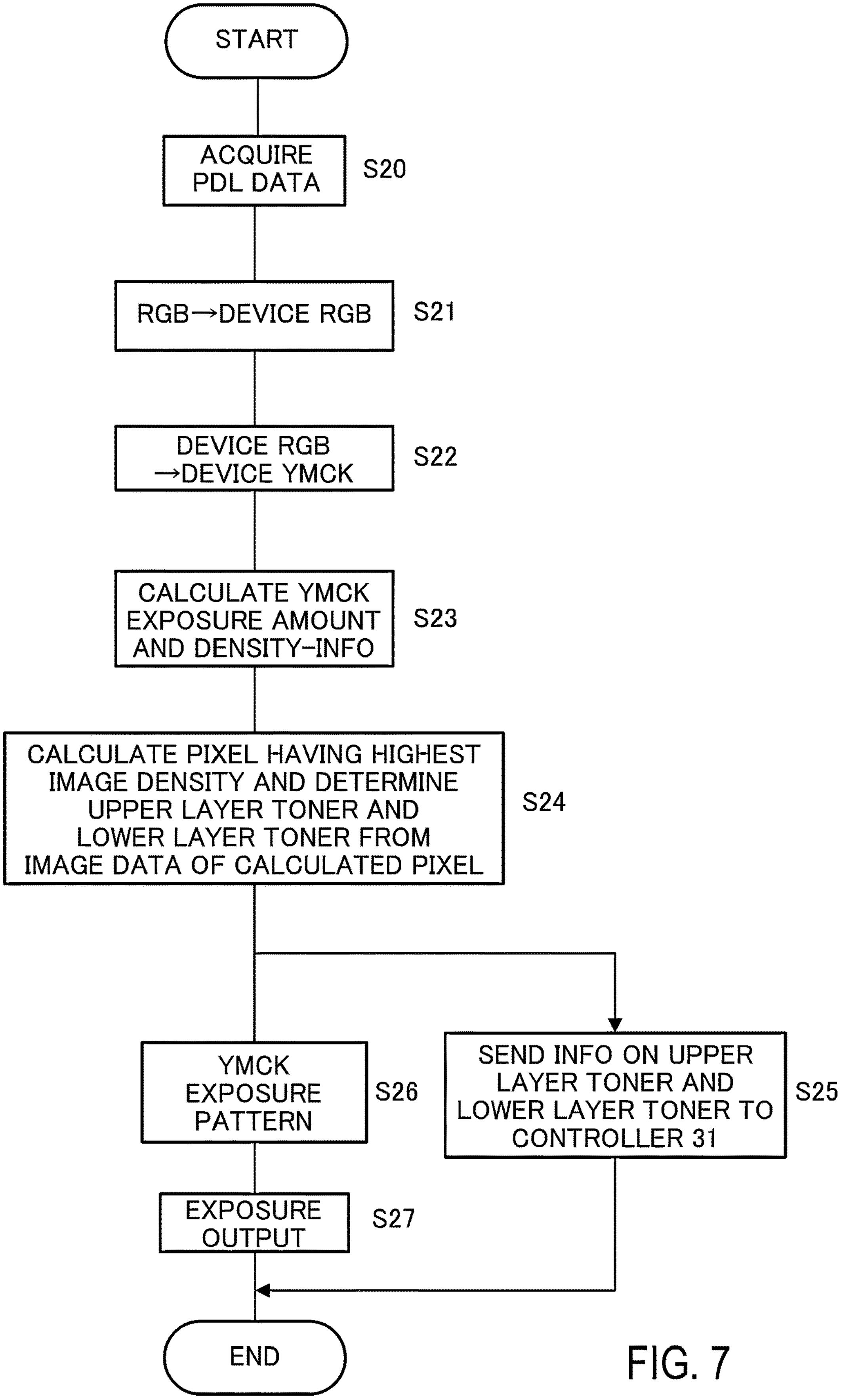
FIG. 7 is a flowchart illustrating an image data processing in the Embodiment 2.

FIG. 7 is a flowchart illustrating the image data processing. In S20, the video controller 30 acquires data sent from the host computer, which is described in a page description language (PDL) and specifies the image data and a printing condition of the image data. The video controller 30 converts the image data described in PDL into the image data (bitmap data) for printing.

In S21, the video controller 30 performs the following converting processing in a case in which the image data is related to a color image, since the image data is in a color information format using RGB (red, green and blue) data. In other words, the video controller 30 assigns and converts the respective color information into device RGB data which can be reproduced by the image forming apparatus P. In S22, the video controller 30 converts the color information in the image data from the device RGB data to device YMCK (yellow, magenta, cyan and black) data. This YMCK data is defined as ratio of a toner amount to a toner amount obtained on the recording material S when lasers of each image forming station of each color are fully turned on, and it has a range of 0% to 100%. A data value of 0% is a value when the laser is turned off completely and the toner amount is zero.

Here, based on the YMCK data, exposure amount for each YMCK color is calculated using a gradation table which stores relationship between the exposure amount for each color and the toner amount actually used. In S23, by the video controller 30 functioning as an image information acquiring means which acquires image information including density information of the toner image, the image density is calculated from the YMCK data. For example, when the image data at a pixel has Y=50%, M=30%, C=60% and K=0%, the image density thereof is calculated as 140% (=50+30+60+0).

(Relationship Between the Density Information and the Toner Amount)

Relationship between the density information and the toner amount on the recording material S will be described. The density information is density information of a pixel which has maximum exposure amount within each image information acquiring area. In the Embodiment 2, minimum value of the density information is set to 0% and maximum density thereof is set to 200%. The density information is correlated with an actual toner amount per unit area on the recording material S, and when the density information is 100%, the toner amount per unit area on the recording material S is, for example, 0.45 $mg/cm^2$. In addition, when the density information is 200%, the toner amount per unit area on the recording material S is, for example, 0.90 $mg/cm^2$.

Return to flowchart. In S24, the video controller 30 calculates the pixel having the highest image density among all pixels through the image data processing, and it determines the upper layer toner and the lower layer toner from the image data of Y, M, C and K of the calculated pixel. For example, in a case in which the image data at the pixel having the highest image density is Y=70%, M=30%, C=60% and K=0%, the upper layer toner is Y and the lower layer toner is C. The video controller 30 also functions as a determining means. Incidentally, a lower limit threshold value may be provided in the image data of the toner, which is to be determined. For example, the lower limit threshold value is set to 30%, and the upper layer toner and the lower layer toner are determined from the toner above the threshold value. This is because the toner with less image data has less impact on the fixing performance. In this case, for example, if the image data at the pixel having the highest image density is Y=70%, M=30%, C=60% and K=10%, then K is excluded for it is below the threshold value, and the upper layer toner and the lower layer toner are selected among Y, M and C. The upper layer toner is determined to be Y and the lower layer toner to be C. In addition, it may be configured, for example, if all are 30% or less, then the fixing temperature correction may not be performed.

In S25, the video controller 30 sends the information on the upper layer toner and the lower layer toner to the control portion 31. In addition, the video controller 30 also executes processes of S26 and S27 in parallel with the process of S25. In S26, the video controller 30 determines exposure output according to a YMCK exposure pattern. In S26, the video controller 30 executes the exposure output. In the Embodiment 2, the usage history values L of the process cartridges 2 for the upper layer toner and the lower layer toner, which are determined in S24 of FIG. 7 by the image data processing, are used to calculate the correcting value for the fixing temperature ΔT.

Determination Method for the Fixing Temperature in the Embodiment 2

Figure 8:
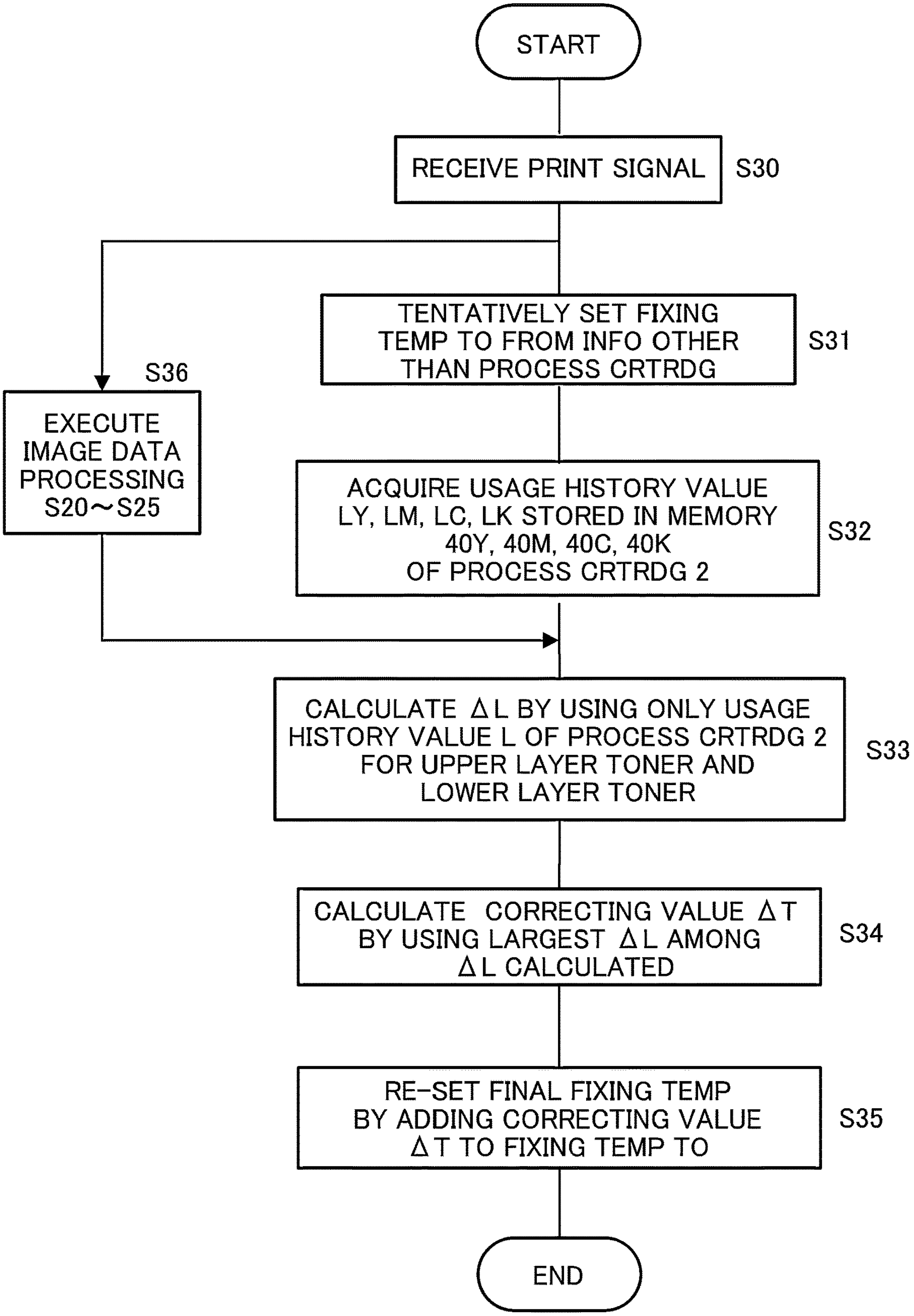
FIG. 8 is a flowchart illustrating a determination method of a fixing temperature in the Embodiment 2.

Determination method for the fixing temperature in the Embodiment 2 is illustrated in a flowchart in FIG. 8. Incidentally, since S30 through S32, S34 and S35 are the same processes as S10 through S12, S14 and S15 in FIG. 5, description thereof will be omitted. In the Embodiment 2, in S36, the control portion 31 causes the video controller 30 to execute the processes of S20 through S25 described in FIG. 7 in parallel with processes of S31 and S32. Through this image data processing, the video controller 30 calculates or identifies the pixel having the highest image density and determines the upper layer toner and the lower layer toner from the image data of Y, M, C and K of that pixel. The control portion 31 receives the information on the upper layer toner and the lower layer toner from the video controller 30 in the process of S25 in FIG. 7.

In S33, the control portion 31 uses the usage history values L of the process cartridges 2 for the upper layer toner and the lower layer toner to calculate the correcting value for the fixing temperature. For example, in an image at the pixel having the highest image density, in a case in which the upper layer toner is Y and the lower layer toner is C, the following equation is calculated and the correcting value for fixing temperature ΔT is calculated as in the Embodiment 1.

$$\Delta L = LY - LC$$

In an image with a less toner amount, the fixing defect is unlikely to occur even if the coated ratio of the toner is unfavorable. The more the toner amount, the more heat is required for the fixing, and in addition, the difference of the adhesive force between with the fixing film 22 and with the recording material S becomes important. In the Embodiment 2, the video controller 30 determines the upper layer toner and the lower layer toner in the image pixel having the highest toner amount among the toner forming the image, and determines the fixing temperature based on the information on the process cartridges 2 of the upper layer toner and the lower layer toner. By this, it becomes possible to determine an appropriate fixing temperature for the image.

As described above, according to the Embodiment 2, it becomes possible to set an appropriate fixing temperature corresponding to the changes in each toner to reduce the fixing defect, even for the image in which a plurality of the toner layers are overlappingly formed on the recording material.

Embodiment 3

An Embodiment 3 is what provides a determination method for an appropriate fixing temperature with a configuration in which the surface of the toner base material is coated with external additives containing the non-melting material to toner in which effective coated ratio by the non-melting material increases as the usage history of the process cartridge 2 gets long. Some toner to which the external additives adhere have a tendency to lose adhesive force of the toner to contacting material as the usage history of the process cartridge 2 gets long. The external additives adhered to such toner are lightly adhered to the surface of the toner at a time of manufacture, however, as the usage history of the process cartridge 2 gets long, these external additives become embedded in the toner base material and solidly adhered thereto. It is considered that an effective real contact area in the fixing process is decreased since it becomes more difficult for the external additives to be detached before the fixing process. The determination method for the fixing temperature in the Embodiment 3 is similar to the Embodiment 1, but equations for determining ΔL is different.

Determination Method for the Fixing Temperature in the Embodiment 3

Figure 9:
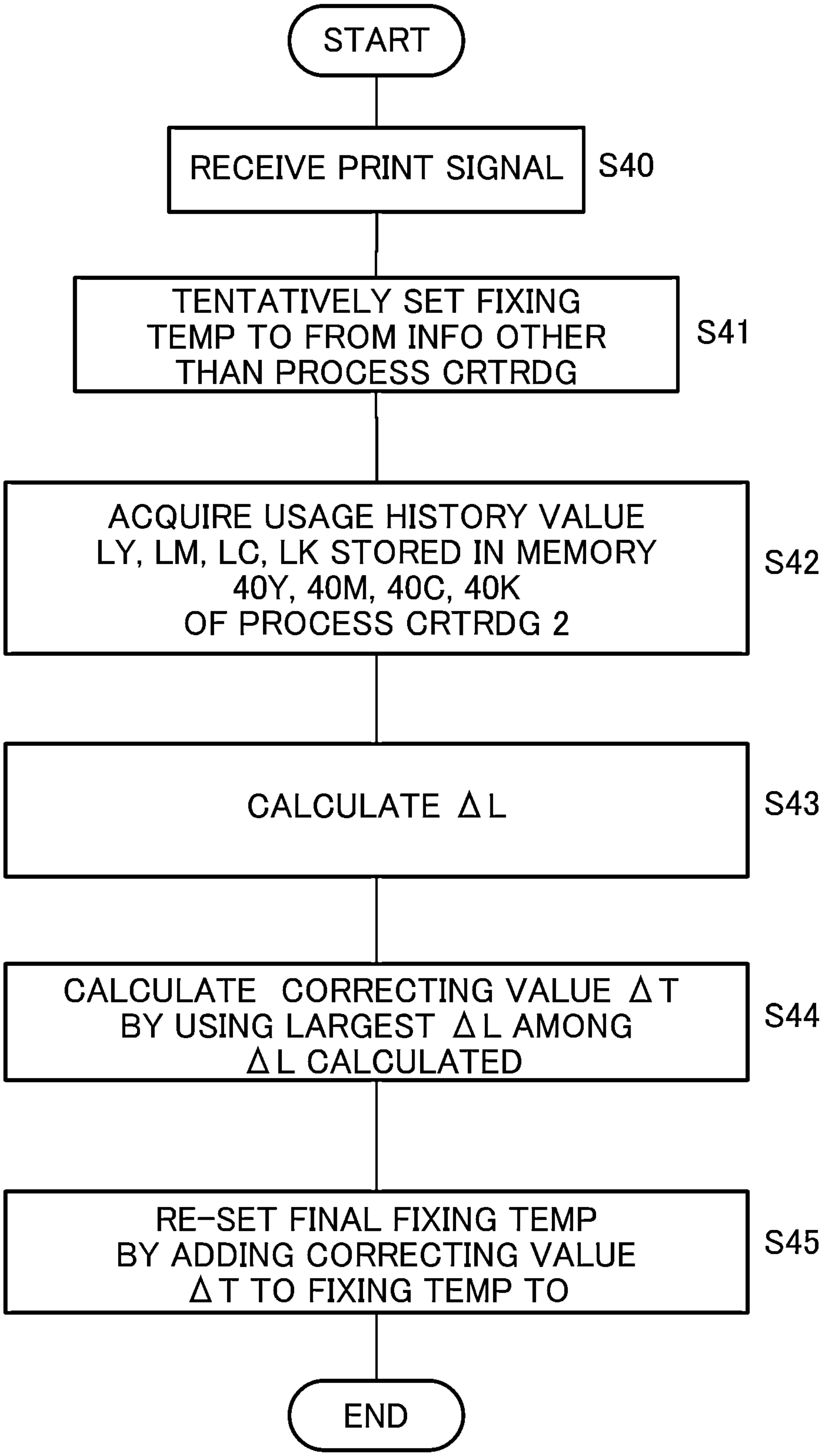
FIG. 9 is a flowchart illustrating a determination method of a fixing temperature in the Embodiment 3.

The determination method for the fixing temperature in the Embodiment 3 is illustrated in a flowchart in FIG. 9. Since processes of S40 through S45 in FIG. 9 are the same as the processes of S10 through S15 in FIG. 5 in the Embodiment 1 except for the calculating equations, description thereof will be omitted.

In S43, the control portion 31 determines the correcting value for the fixing temperature ΔT using the difference ΔL of the usage history values L of the process cartridges 2 as in the Embodiment 1, however, the calculation is performed using the following equations.

The following six types of calculations are performed.

$$\Delta L = LM - LY$$

$$\Delta L = LC - LY$$

$$\Delta L = LK - LY$$

$$\Delta L = LC - LM$$

$$\Delta L = LK - LM$$

$$\Delta L = LK - LC$$

In S44, the control portion 31 performs a calculation of the correcting value for the fixing temperature ΔT with the following equation using ΔL having a highest value among the calculated ΔL.

The correcting value for the fixing temperature ΔT (° C.)=the correcting coefficient×ΔL In S45, the control portion 31 adds the correcting value for the fixing temperature ΔT to a fixing temperature T0 to determine a final fixing temperature.

In the Embodiment 3, the difference ΔL is defined as "the usage history value L of the lower layer toner—the usage history value L of the upper layer toner". Since the longer the usage history, the smaller the effective real contact area, order of the equation is opposite to the Embodiment 1 (S13 in FIG. 5). Also in the Embodiment 3, the fixing temperature is determined using the difference between the usage history value of the process cartridge 2 which supplies the toner contacting the fixing film 22 side and the usage history value of the process cartridge 2 which supplies the toner contacting the recording material S side. By this, even for the image in which a plurality of the toner layers are overlappingly formed, it becomes possible to set an appropriate fixing temperature corresponding to the changes in the toner.

As described above, according to the Embodiment 3, it becomes possible to set an appropriate fixing temperature corresponding to the changes in each toner to reduce the fixing defect, even for the image in which a plurality of the toner layers are overlappingly formed on the recording material.

According to the present invention, even for the image in which a plurality of the toner layers are overlappingly formed on the recording material, an appropriate fixing temperature can be set corresponding to the changes in each toner to reduce the fixing defect.

The disclosure of the present embodiments includes the following constitution examples.

(Constitution 1)

An image forming apparatus comprising:

a plurality of developing means configured to form toner images;

transfer means configured to sequentially transfer the toner images onto a recording material and to overlappingly form the toner image on the recording material;

fixing means configured to press and heat the recording material on which the toner images are transferred and to fix the toner images on the recording material;

a storage medium configured to store a usage history of the developing means; and a control means configured to control a fixing temperature of the fixing means, wherein the control means determines the fixing temperature based on a difference between the usage history of one of the developing means stored in the storage medium and the usage history of another of the developing means.

(Constitution 2)

An image forming apparatus according to Constitution 1, further comprising image information acquiring means configured to acquire image information, wherein the control means determines the fixing temperature based on a difference between the image information acquired by the image information acquiring means and the usage history of the plurality of the developing means.

(Constitution 3)

An image forming apparatus according to Constitution 1, wherein in the toner images overlappingly formed on the recording material, when of the toner overlapped on the recording material, toner of the toner image formed nearest to the recording material is defined as lower layer toner and toner of the toner image formed farthest from the recording material is defined as upper layer toner, the control means determines the fixing temperature based on a difference between the usage history of the developing means which forms the upper layer toner and the usage history of the developing means which forms the lower layer toner.

(Constitution 4)

An image forming apparatus according to Constitution 1, further comprising image information acquiring means configured to acquire image information, and determining means configured to determine a toner image of which image data amount is largest based on the image information acquired by the image information acquired means in the toner images overlappingly formed on the recording material, wherein, when of the toner which forms the toner image determined by the determining means, toner of the toner image formed nearest to the recording material is defined as lower layer toner and toner of the toner image formed farthest from the recording material is defined as upper layer toner, the control means determines the fixing temperature based on a difference between the usage history of the developing means which forms the upper layer toner and the usage history of the developing means which forms the lower layer toner.

(Constitution 5)

An image forming apparatus according to Constitution 3, wherein the toner contains a thermoplastic resin as a main material and is toner in which particles made of material having a higher melting point than that of the thermoplastic resin are adhered to an outside of the toner, and wherein the control means determines the fixing temperature so that the fixing temperature becomes higher as a difference between the usage history of the developing means which forms the upper layer toner and the usage history of the developing means which forms the lower layer toner is larger.

(Constitution 6)

An image forming apparatus according to claim 1, wherein the developing means is a rotatable member, and wherein the usage history is a total running distance of the rotatable member.

(Constitution 7)

An image forming apparatus according to Constitution 6, wherein the total running distance is based on a peripheral speed of a surface of the rotatable member and a time when the rotatable member rotates.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-171920 filed on Oct. 3, 2023, which is hereby incorporated by reference herein in its entirety.

What is claimed is:

1. An image forming apparatus comprising:

a plurality of developing means configured to form toner images;

transfer means configured to sequentially transfer the toner images onto a recording material and to overlappingly form the toner image on the recording material;

fixing means configured to press and heat the recording material on which the toner images are transferred and to fix the toner images on the recording material;

a storage medium configured to store a usage history of the plurality of developing means; and a control means configured to control a fixing temperature of the fixing means, wherein the control means determines the fixing temperature based on a difference between the usage history of one of the developing means stored in the storage medium and the usage history of another of the developing means.

2. An image forming apparatus according to claim 1, further comprising image information acquiring means configured to acquire image information, wherein the control means further determines the fixing temperature based on a difference between the image information acquired by the image information acquiring means and the usage history of the plurality of the developing means.

3. An image forming apparatus according to claim 1, wherein in the toner images overlappingly formed on the recording material, when of the toner overlapped on the recording material, toner of the toner image formed nearest to the recording material is defined as lower layer toner and toner of the toner image formed farthest from the recording material is defined as upper layer toner, the control means determines the fixing temperature based on a difference between the usage history of the developing means which forms the upper layer toner and the usage history of the developing means which forms the lower layer toner.

4. An image forming apparatus according to claim 1, further comprising image information acquiring means configured to acquire image information, and determining means configured to determine a toner image of which image data amount is largest based on the image information acquired by the image information acquired means in the toner images overlappingly formed on the recording material, wherein, when of the toner which forms the toner image determined by the determining means, toner of the toner image formed nearest to the recording material is defined as lower layer toner and toner of the toner image formed farthest from the recording material is defined as upper layer toner, the control means determines the fixing temperature based on a difference between the usage history of the developing means which forms the upper layer toner and the usage history of the developing means which forms the lower layer toner.

5. An image forming apparatus according to claim 3, wherein the toner contains a thermoplastic resin as a main material and is toner in which particles made of material having a higher melting point than that of the thermoplastic resin are adhered to an outside of the toner, and wherein the control means determines the fixing temperature so that the fixing temperature becomes higher as a difference between the usage history of the developing means which forms the upper layer toner and the usage history of the developing means which forms the lower layer toner is larger.

6. An image forming apparatus according to claim 1, wherein each developing means is a rotatable member, and wherein the usage history is a total running distance of the rotatable member.

7. An image forming apparatus according to claim 6, wherein the total running distance is based on a peripheral speed of a surface of the rotatable member and a time when the rotatable member rotates.

* * * * *